(12) United States Patent
Li et al.

(10) Patent No.: US 10,416,336 B2
(45) Date of Patent: Sep. 17, 2019

(54) METHOD OF ESTIMATING ANISOTROPIC FORMATION RESISTIVITY PROFILE USING A MULTI-COMPONENT INDUCTION TOOL

(75) Inventors: Shanjun Li, Katy, TX (US); Dagang Wu, Katy, TX (US); Luis E. San Martin, Houston, TX (US); Yumei Tang, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1163 days.

(21) Appl. No.: 14/409,931

(22) PCT Filed: Jul. 13, 2012

(86) PCT No.: PCT/US2012/046766
§ 371 (c)(1),
(2), (4) Date: Apr. 16, 2015

(87) PCT Pub. No.: WO2014/011190
PCT Pub. Date: Jan. 16, 2014

(65) Prior Publication Data
US 2016/0054467 A1    Feb. 25, 2016

(51) Int. Cl.
*G01V 3/28*    (2006.01)
*G01V 3/18*    (2006.01)
(Continued)

(52) U.S. Cl.
CPC ............ *G01V 3/28* (2013.01); *E21B 49/00* (2013.01); *G01V 3/18* (2013.01); *G01V 3/34* (2013.01); *G01V 3/38* (2013.01)

(58) Field of Classification Search
CPC ... G01V 3/18; G01V 3/38; G01V 3/28; G01V 3/34; E21B 49/00
(Continued)

(56) References Cited

U.S. PATENT DOCUMENTS

| 5,854,991 A | 12/1998 | Gupta et al. |
| 5,867,806 A | 2/1999 | Strickland et al. |

(Continued)

FOREIGN PATENT DOCUMENTS

WO    2011/091216 A2    7/2011

OTHER PUBLICATIONS

International Search Report issued in related PCT Application No. PCT/US2012/046766 dated Apr. 19, 2013, 12 pages.
(Continued)

*Primary Examiner* — Yoshihisa Ishizuka
(74) *Attorney, Agent, or Firm* — Benjamin Fite; Baker Botts L.L.P.

(57) ABSTRACT

Improved algorithm for estimating anisotropic formation resistivity profile using a multi-component induction tool are disclosed. A method for estimating anisotropic formation resistivity profile of a formation comprises obtaining borehole corrected log data and determining at an azimuth angle of the formation. One or more formation bed boundaries are located and initial formation properties are calculated. One of a plurality of inversion windows is sequentially selected and a one-dimensional inversion of each of the sequentially selected one of the plurality of inversion windows is performed.

20 Claims, 5 Drawing Sheets

(51) Int. Cl.
  *G01V 3/38* (2006.01)
  *E21B 49/00* (2006.01)
  *G01V 3/34* (2006.01)
(58) Field of Classification Search
  USPC .......................................................... 702/7
  See application file for complete search history.

(56) References Cited

U.S. PATENT DOCUMENTS

| | | | |
|---|---|---|---|
| 6,047,240 | A | 4/2000 | Barber et al. |
| 6,643,589 | B2 | 11/2003 | Zhang et al. |
| 6,819,112 | B2 | 11/2004 | Gianzero |
| 8,184,502 | B2 | 5/2012 | Xu et al. |
| 2005/0083063 | A1* | 4/2005 | Omeragic ............... G01V 3/28 324/338 |
| 2005/0274512 | A1* | 12/2005 | Tabarovsky ............ G01V 3/28 166/254.2 |
| 2007/0267192 | A1* | 11/2007 | Wang ................... E21B 47/026 166/254.2 |
| 2008/0157773 | A1* | 7/2008 | Yu ........................... G01V 3/28 324/339 |
| 2010/0156424 | A1* | 6/2010 | Bittar ...................... G01V 3/28 324/339 |
| 2010/0198569 | A1 | 8/2010 | Wu et al. |
| 2011/0166842 | A1 | 7/2011 | Banning-Geertsma et al. |

OTHER PUBLICATIONS

Written Opinion of the International Preliminary Examination Authority issued in related PCT Application No. PCT/US2012/046766 dated Oct. 16, 2014, 8 pages.

Sanches-Ramirez et al., "Field examples of the combined petrophysical inversion of gamma-ray, density and resistivity logs acquired in thinly-bedded clastic rock formations," SPWLA 50th Annual Logging Symposium (Jun. 24, 2009), 16 pages.

* cited by examiner

METHOD OF ESTIMATING ANISOTROPIC FORMATION RESISTIVITY PROFILE USING A MULTI-COMPONENT INDUCTION TOOL

CROSS-REFERENCE TO RELATED APPLICATION

This application is a U.S. National Stage Application of International Application No. PCT/US2012/046766 filed Jul. 13, 2012, which is hereby incorporated by reference in its entirety.

BACKGROUND

The basic techniques for electromagnetic logging for earth formations are well known. For instance, induction logging to determine resistivity (or its inverse, conductivity) of earth formations adjacent a borehole has long been a standard and important technique in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

The resistivity of a given formation may be isotropic (equal in all directions) or anisotropic (unequal in different directions). In electrically anisotropic formations, the anisotropy is generally attributable to extremely fine layering during the sedimentary build-up of the formation. As a result, in a formation Cartesian coordinate system oriented such that the x-y plane is parallel to the formation layers and the z axis is perpendicular to the formation layers, resistivities Rx and Ry in the x and y directions, respectively, tend to be similar, but resistivity Rz in the z direction tends to be different. The resistivity in a direction parallel to the formation plane (i.e., the x-y plane) is known as the horizontal resistivity, Rh, and the resistivity in the direction perpendicular to the plane of the formation (i.e., the z direction) is known as the vertical resistivity, Rv. The index of anisotropy, $\eta$, is defined as $\eta=[Rv/Rh]^{1/2}$.

As a further complication to measuring formation resistivity, boreholes are generally perpendicular to formation beds. The angle between the axis of the well bore and the orientation of the formation beds (as represented by the normal vector) has two components. These components are the dip angle and the azimuth angle. The dip angle is the angle between the borehole axis and the normal vector for the formation bed. The azimuth angle is the direction in which the borehole's axis "leans away from" the normal vector.

Electromagnetic resistivity logging measurements are a complex function of formation resistivity, formation anisotropy, and the formation dip and azimuth angles, which may all be unknown. A triaxial induction well logging tool may be used to detect formation properties such as resistivity anisotropy, which is one of the important parameters in evaluation subterranean formations such as sand-shale reservoirs or fractured reservoirs. However, the resistivity anisotropy parameter cannot be obtained without performing a numerical inversion process. Specifically, numerical inversion may be required to obtain accurate formation resistivity anisotropy parameters. The log inversion required for anisotropy determination may involve a large number of inversion parameters to be determined by an algorithm referred to as the 1D vertical inversion ("V1D"). Generally, this algorithm may require large amounts of processing time and be sensitive to noise from logging, the logging environment characteristics and borehole correction, which could result in errors in the inverted vertical resistivity. Accordingly, it is desirable to develop an improved inversion algorithm that can be used to obtain accurate formation characteristics.

BRIEF DESCRIPTION OF THE DRAWING(S)

The present disclosure will be more fully understood by reference to the following detailed description of the preferred embodiments of the present disclosure when read in conjunction with the accompanying drawings, in which like reference numbers refer to like parts throughout the views, wherein.

Figure 1:
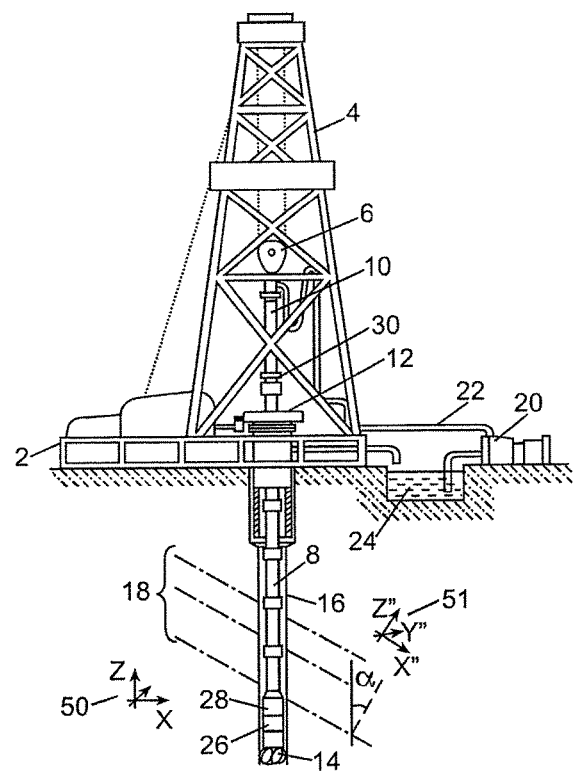
FIG. 1 depicts an illustrative logging while drilling ("LWD") environment.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing. The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

The present invention relates generally to testing and evaluation of subterranean formation fluids and, more particularly, to an improved algorithm for estimating anisotropic formation resistivity profile using a multi-component induction logging tool.

Accordingly, in order to improve the accuracy and efficiency of the inversion of the vertical resistivity, a rigorous inversion algorithm is presented to determine simultaneously the horizontal and vertical conductivities, bed boundary positions and dip angle from multi-component induction logging data in anisotropic layered media. Aspects of the methods disclosed herein facilitate a quick azimuth angle correction; formation boundary determination; multi-layer sliding window inversion; and a quick Jacobian matrix computation.

Turning now to FIG. 1, an illustrative logging while drilling ("LWD") environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through one or more formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity of the borehole 16.

An electromagnetic resistivity logging tool 26 may be integrated into the bottom-hole assembly near the bit 14. As the bit extends the borehole 16 through the formation 18, logging tool 26 collects measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments, the tool includes a 3-axis fluxgate magnetometer and a 3-axis accelerometer. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

In one embodiment, the logging tool 26 includes a rotational position indicator array that may contain both a 3-axis fluxgate magnetometer and a 3-axis accelerometer. As would be appreciated by those of ordinary skill in the art, with the benefit of this disclosure, the combination of those two sensor systems enables the measurement of the logging tool 26 face, inclination, and azimuth orientation angles of the borehole 16. The logging tool 26 face and borehole 16 inclination angles are calculated from the accelerometer sensor output. The magnetometer sensor outputs are used to calculate the borehole 16 azimuth. With the logging tool 26 face, the borehole 16 inclination, and the borehole 16 azimuth information, a logging tool 26 in accordance with the present invention can be used to steer the bit to a desirable formation bed of the formation 18. Specifically, the response difference or the response ratio can be used effectively to enter a desired payzone or to stay within the payzone of interest.

Figure 2:
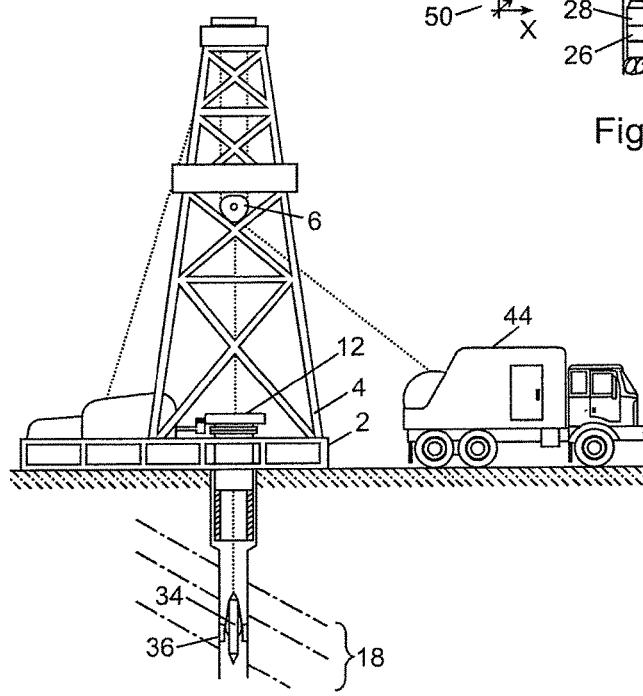
FIG. 2 depicts an illustrative logging environment with the drill string removed from the borehole.

At various times during the drilling process, the drill string 8 may be removed from the borehole 16 as shown in FIG. 2. Once the drill string 8 has been removed, logging operations can be conducted using a wireline logging tool 34, i.e., a sensing instrument sonde suspended by a cable having conductors for transporting power to the tool and telemetry from the tool to the surface. A resistivity imaging portion of the logging tool 34 may have centralizing arms 36 that center the tool within the borehole as the tool is pulled uphole. A logging facility 44 may collect measurements from the logging tool 34, and may include computing facilities for processing and storing the measurements gathered by the logging tool.

Figure 3:
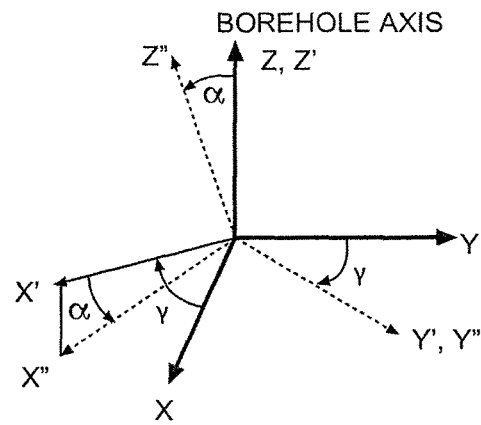
FIG. 3 depicts a relationship between a borehole Cartesian coordinate system and a formation Cartesian coordinate system.

Returning again to FIG. 1, it shows that the formation beds of the formation 18 are not perpendicular to the borehole 16, which may occur naturally or due to directional drilling operations. The borehole 16 may have a Cartesian coordinate system 50 defined in accordance with the borehole's long axis (the z-axis) and the north side (or alternatively, the high side) of the borehole 16 (the x-axis). The formation beds of the formation 18, when characterized as a plane, may have a Cartesian coordinate system 51 defined in accordance with the normal to the plane (the z"-axis) and the direction of steepest descent (the x"-axis). As shown in FIG. 3, the two Cartesian coordinate systems are related by two rotations. Beginning with the borehole's Cartesian coordinate system (x,y,z), a first rotation of angle γ is made about the z-axis. The resulting Cartesian coordinate system is denoted (x',y',z'). Angle γ is the relative azimuth angle, which indicates the direction of the formation dip relative to the borehole's Cartesian coordinate system. A second rotation of angle α is then made about the y' axis. This aligns the borehole Cartesian coordinate system with the formation Cartesian coordinate system. Angle α is the relative dip angle, which is the slope angle of the formation beds of the formation 18 relative to the long axis of the borehole 16.

The vertical resistivity is generally found to be the resistivity as measured perpendicular to the plane of the formation bed of the formation 18, and the horizontal resistivity is the resistivity as measured within the plane of the formation bed of the formation 18. Determination of each of these formation parameters (dip angle, azimuth angle, vertical resistivity, and horizontal resistivity) is desirable.

Figure 4:
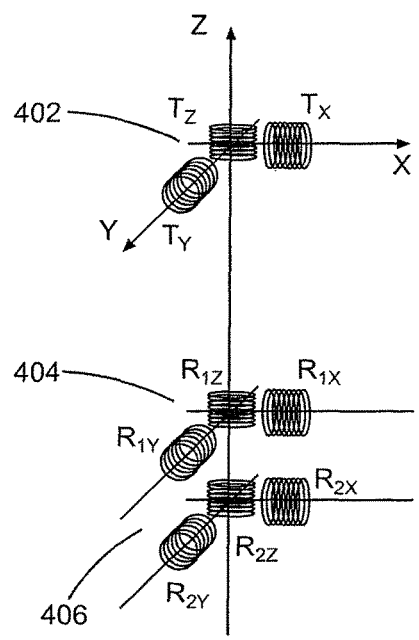
FIG. 4 depicts a hypothetical antenna configuration for a multi-component induction logging tool.

FIG. 4 shows a hypothetical antenna configuration for a multi-component induction logging tool, which may be embodied as a wireline tool as well as a logging while drilling tool. A triad of transmitter coils $T_X$, $T_Y$, and $T_Z$, each oriented along a respective axis, may be provided and is generally denoted with reference numeral 402. At least one triad of similarly oriented receiver coils $R_{1X}$, $R_{1Y}$, and $R_{1Z}$ may also be provided and is generally denoted with reference numeral 404. The receiver coils may be used to collect electromagnetic signals from the surrounding formation which is excited by the transmitter coils. In some multi-component induction logging tools, in order to remove the signal that goes directly from the transmitter to the receiver and obtain a better measurement of the formation response, a receiver may include two functional parts, a main triad of receiver coils 406 ($R_{2X}$, $R_{2Y}$, and $R_{2Z}$) and a bucking triad of receiver coils 404 ($R_{1X}$, $R_{1Y}$, and $R_{1Z}$). For received signal measurements relative to the amplitude and phase of the transmitted signal (sometimes called "absolute" measurements) only one receiver triad may be used. Additionally, the use of two separate triads of receiver coils facilitates obtaining differential measurements which offer an increased spatial resolution.

Figure 5:
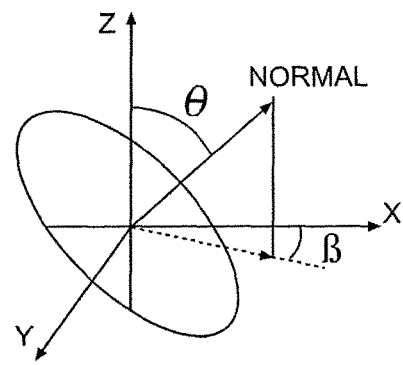
FIG. 5 depicts two angles that may be used to specify the orientation of a coil antenna.

FIG. 5 shows two angles that may be used to specify the orientation of a coil antenna. The coil antenna may be considered as residing in a plane having a normal vector. Tilt angle θ is the angle between the longitudinal axis of the tool and the normal vector. In the downhole context, azimuthal angle β may represent the angle between projection of the normal vector in the X-Y plane and the x-axis of the borehole Cartesian coordinate system.

The magnetic field responses in tool coordinate system for the multi-component induction logging tools in general dipping transverse-isotropic formations can be expressed as the following matrix $H^t$:

$$H^t = \begin{bmatrix} H^t_{xx} & H^t_{xy} & H^t_{xz} \\ H^t_{yx} & H^t_{yy} & H^t_{yz} \\ H^t_{zx} & H^t_{zy} & H^t_{zz} \end{bmatrix} \quad \text{Eq. (1)}$$

where the first subscript represents the direction of the transmitter and the second subscript represents the direction of the receiver.

Consider the parameter vector X represents the vector of unknown parameters as:

$$X = [\sigma_{h1}, \lambda_1, \sigma_{h2}, \lambda_2, \ldots, \sigma_{hi}, \lambda_i, \ldots, \sigma_{hL}, \lambda_L, Z_1, Z_2, \ldots, Z_i, \ldots, Z_{L-1}, \theta]^T \quad \text{Eq. (2)}$$

where the superscript T indicates transposition, $\sigma_{hi}$ and $\sigma_{vi}$ are the horizontal and vertical conductivities of the ith layer, $z_i$ is the ith boundary position and θ is the dip angle. The measurement data may then be denoted by a vector m as:

$$m = [\sigma_{xx,1}, \sigma_{xz,1}, \sigma_{yy,1}, \sigma_{zx,1}, \sigma_{zz,1}, \ldots, \sigma_{xx,P}, \sigma_{xz,P}, \sigma_{yy,P}, \sigma_{zx,P}, \sigma_{zz,P}]^T \quad \text{Eq. (3)}$$

where P is the number of selected logging points. Accordingly, the total number of measured data points (M) is 5P. When performing a V1D inversion, the goal is to determine a set of conductivities and boundaries along with a dipping angle that can reproduce these measured values. This goal may be achieved by iteratively solving a non-linear problem by minimizing the objective cost function:

$$C(X) = \frac{1}{2}[\|e(X)\|^2] + \lambda \|X - X_{ref}\|^2 \quad \text{Eq. (4)}$$

where λ is the dumping factor, $X_{ref}$ is reference vector of parameter and the residual vector ("e(X)") may be defined as:

$$e(X) = \begin{bmatrix} S_1(X) - m_1 \\ S_2(X) - m_2 \\ \vdots \\ S_j(X) - m_j \\ \vdots \\ S_M(X) - m_M \end{bmatrix} \quad \text{Eq. (5)}$$

where $S_j(X)$ is the modeled tool response corresponding to a particular value of parameter vector X and $m_j$ is the corresponding measured data, and $\| \|^2$ is the $L^2$-norm.

Figure 6:
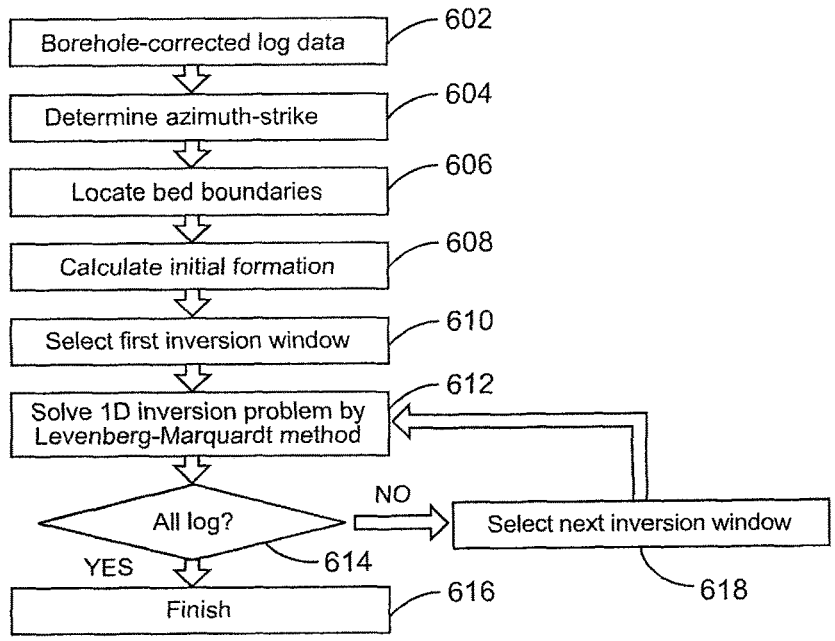
FIG. 6 depicts method steps for performing a V1D inversion in accordance with an embodiment of the present disclosure.

FIG. 6 depicts method steps for performing a V1D inversion in accordance with an embodiment of the present disclosure. As shown in FIG. 6, first, at step 602, borehole-corrected log data is obtained from a logging tool, representing the measured data. The logging tool may be a LWD, a MWD tool, or a wireline tool.

Using the obtained data, at step 604, azimuth angle of the formation is determined. The magnetic field responses in the tool coordinate system for tri-axial induction logging tools in dipping transverse-isotropic formation with zero azimuth can be expressed as the following matrix H:

$$H = \begin{bmatrix} Hxx & 0 & Hxz \\ 0 & Hyy & 0 \\ Hzx & 0 & Hzz \end{bmatrix} \quad \text{Eq. (6)}$$

Based on the Euler rotation theorem, a straightforward relationship between $H^t$ and H may be derived as:

$$H^t = R^t \cdot H \cdot R \quad \text{Eq. (7)}$$

where R is the rotation matrix with respect to the azimuth angle (β) and may be defined as:

$$R = \begin{bmatrix} \cos\beta & \sin\beta & 0 \\ -\sin\beta & \cos\beta & 0 \\ 0 & 0 & 1 \end{bmatrix} \quad \text{Eq. (8)}$$

The following equation may then be derived from the above equations:

$$\begin{bmatrix} H_{XX}^T & H_{XY}^T & H_{XZ}^T \\ H_{YX}^T & H_{YY}^T & H_{YZ}^T \\ H_{ZX}^T & H_{ZY}^T & H_{ZZ}^T \end{bmatrix} = \qquad \text{Eq. (9)}$$

$$\begin{bmatrix} H_{XX}\cos^2\beta + H_{YY}\sin^2\beta & (H_{XX}-H_{YY})\cos\beta\sin\beta & H_{XZ}\cos\beta \\ (H_{XX}-H_{YY})\cos\beta\sin\beta & H_{YY}\cos^2\beta + H_{XX}\sin^2\beta & H_{XZ}\sin\beta \\ H_{ZX}\cos\beta & H_{ZX}\sin\beta & H_{ZZ} \end{bmatrix}$$

$$\begin{bmatrix} H_{xx}^t & H_{xy}^t & H_{xz}^t \\ H_{yx}^t & H_{yy}^t & H_{yz}^t \\ H_{zx}^t & H_{zy}^t & H_{zz}^t \end{bmatrix} =$$

$$\begin{bmatrix} H_{xx}\cos^2\beta + H_{yy}\sin^2\beta & (H_{xx}-H_{yy})\cos\beta\sin\beta & H_{xz}\cos\beta \\ (H_{xx}-H_{yy})\cos\beta\sin\beta & H_{yy}\cos^2\beta + H_{xx}\sin^2\beta & H_{xz}\sin\beta \\ H_{zx}\cos\beta & H_{zx}\sin\beta & H_{zz} \end{bmatrix}$$

The azimuth angle may then be calculated from one of the following equations:

$$\beta = \tan^{-1}\left(\frac{[RE(H)]_{YZ}^t}{[RE(H)]_{xz}^t}\right) \qquad \text{Eq. (10a)}$$

$$\beta = \tan^{-1}\left(\frac{[IM(H)]_{yz}^t}{[Im(H)]_{xx}^t}\right) \qquad \text{Eq. (10b)}$$

$$\beta = \tan^{-1}\left(\frac{[RE(H)]_{zy}^t}{[RE(H)]_{zx}^t}\right) \qquad \text{Eq. (10c)}$$

$$\beta = \tan^{-1}\left(\frac{[IM(H)]_{zy}^t}{IM(H_{zx}^t)}\right) \qquad \text{Eq. (10d)}$$

$$\beta = \frac{\tan^{-1}\left(\frac{[RE(H)]_{XY}^t + H_{YX}^t}{[RE(H)]_{XX}^t - H_{YY}^t}\right)}{2} \qquad \text{Eq. (10e)}$$

$$\beta = \frac{\tan^{-1}\left(\frac{[RE(H)]_{xy}^t + H_{yx}^t}{[RE(H)]_{xx}^t - H_{yy}^t}\right)}{2}$$

$$\beta = \frac{\tan^{-1}\left(\frac{[IM(H)]_{xy}^t + H_{yx}^t}{[IM(H)]_{xx}^t - H_{yy}^t}\right)}{2} \qquad \text{Eq. (10f)}$$

Once the azimuth angle is known, the measurement field matrix $H^t$ can be transformed into the magnetic field matrix H for zero azimuth angle:

$$H = R \cdot H^t \cdot R^t \qquad \text{Eq. (11)}$$

where only five non-zero components exist.

In certain embodiments, another method may be used to determine an azimuth angle for a formation bed of the formation 18. This method may be based on a simple global searching scheme. In this scheme, the matrix H is first computed from $H^t$ using equation (11) for all azimuth angles between 0 and 360 degrees. All these calculated H matrices at different azimuth angles may then be examined to find the one H matrix with minimum XY/YX/YZ/ZY values. The angle used in its associated rotation matrix R may then be selected as the final azimuth angle solution.

As would be appreciated by those of ordinary skill in the art, with the benefit of this disclosure, although the above formulations are derived for magnetic fields, the same derivations and formulations may be obtained and applied to apparent conductivity matrices.

Figure 7:
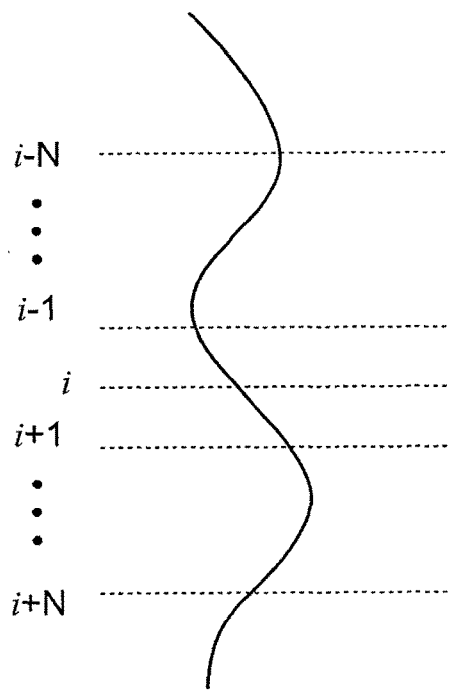
FIG. 7 depicts steps for selecting a window used to compute a variance.

Once the azimuth angle is determined at step 604, at step 606 formation bed boundaries are located. In a V1D layered formation model, a formation bed boundary is defined as a location of a horizontal plane where adjacent formation properties significantly differ from each other. Initial bed boundaries will be determined by a variance based method of combined conductivity reading $a \cdot \sigma_{zz} + b \cdot \sigma_{xx} + c \cdot \sigma_{yy}$ where coefficients a, b and c are optimally selected from both synthetic and real-field examples. FIG. 7 shows steps for select a window used to compute variance of $a \cdot \sigma_{zz} + b \cdot \sigma_{xx} + c \cdot \sigma_{yy}$. If the variance at the $i^{th}$ logging point is to be computed, a symmetrical logging point window around the $i^{th}$ logging point is determined, in which there are 2*N+1 logging points. The average value in the window may then be computed by $$a_i = \frac{1}{2*N+1} \sum_{j=i-N}^{i+N} Y_i \qquad \text{Eq. (12)}$$

where $Y_i = a*zz_i + b*xx_i + c*yy_i$ or $Y_i = \log(a*zz_i + b*xx_i + c*yy_i)$.

The variance of $a \cdot \sigma_{zz} + b \cdot \sigma_{xx} + c \cdot \sigma_{yy}$ at logging point i can be computed by $$v_i^2 = \frac{1}{n} \sum_{j=i-n/2}^{i+n/2} [\log(R_{aj}) - a_i]^2. \qquad \text{Eq. (13)}$$

Figure 8:
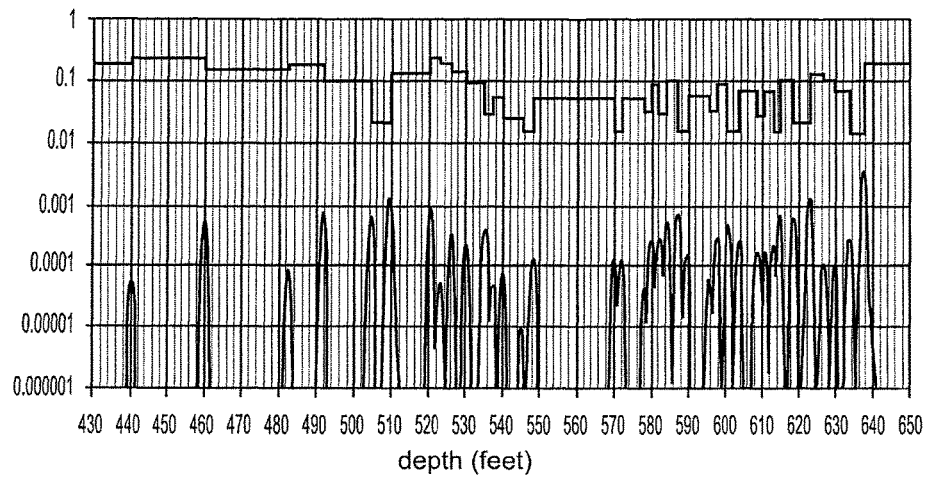
FIG. 8 depicts an illustrative graph using a variance curve to determine initial formation vertical boundary position.

After the variance value of all logging points are computed, one can obtain a variance curve for the logging points. FIG. 8 shows an example of using a variance curve to determine an initial formation vertical boundary position of a formation bed of a formation. The square curve in FIG. 8 is a formation resistivity distribution with a boundary position and the other curve is the computed variance curve. The computed variance curve may then be used to determine the boundary positions formation bed of the formation. Specifically, the boundary position is located around the peaks of the variance curve. So, the peak positions can be used to indicate initial boundary positions. Considering noise of measurements, there may be fake boundaries that are identified if all peaks of the variance curve are selected to indicate boundary positions. Therefore, a threshold has to be selected. Once a threshold is selected, all logging points with a peak value of the variance curve larger than a predefined threshold value are selected as starting bed boundaries. The threshold can be different at different intervals of a well. These starting bed boundaries may then be examined and filtered to ensure that only one bed boundary point can exist within a predefined depth window corresponding to the maximum vertical resolution of the multi-component induction logging tool. Initial formation parameters are then calculated at step 608. The initial formation parameters may include, but are not limited to, dipping angle, horizontal conductivity, and vertical conductivity.

In order to provide an initial formation model for the V1D layer inversion, a zero-D homogenous inversion may be performed. In this zero-D inversion, logging points sitting at the middle of each bed/layer are used as inputs. As discussed in more detail below, a constrained Levenberg-Marquardt nonlinear minimization approach may be applied to solve this zero-D inversion. In this zero-D inversion, three parameters (the dipping angle, horizontal conductivity, and vertical conductivity) are inverted for each layer. Since analytical formulations can be used to calculate forward modeling, computing forward differences for a Jacobian matrix is accomplished so quickly that no approximation of Jacobian computation is required. Additionally, if conventional ZZ-processing results are available, they may be applied as initial values for horizontal resistivity profiles.

When performing logging inversion processing, a large number of layers may need to be inverted, which results in a large 1-D layered inversion problem with many unknowns. The large number of unknowns in an inversion model increases computation complexity and deteriorates inversion accuracy and efficiency. The present disclosure provides a layer-sliding inversion scheme where a fixed number of layers are modeled in each subinversion window. Once the problem of a subinversion window is solved, the first layer's formation parameters are marked as known and removed from the next subinversion window. A new layer is then included in the next inversion window and the process continues until all layers are processed. Returning now to FIG. 6, the recited steps are denoted with reference numerals 612-618.

Figure 9:
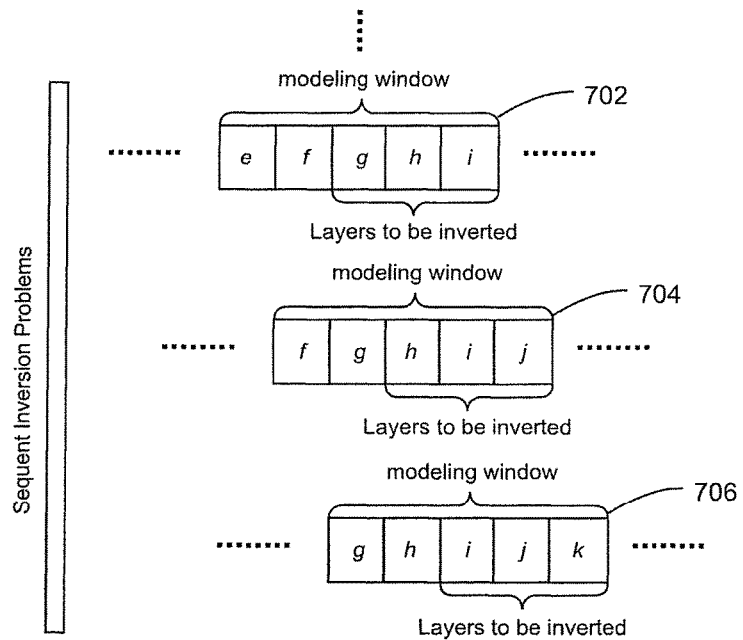
FIG. 9 depicts an illustrative five layer inversion window used in conjunction with an exemplary embodiment of the present disclosure.

Specifically, steps 612-618 are discussed herein in conjunction with the illustrative five-layer window of FIG. 9. The formation model used in forward modeling to calculate Jacobian matrix is a five-layer formation with outmost boundaries extended to infinity.

Returning now to FIG. 6, first, at step 610, a first inversion window is selected. In FIG. 9, in the first iteration (denoted as 702) the formation properties of layers e and f are assumed to be already inverted from previous inversion steps and are therefore known. However, in the first iteration (702) the formation properties of the other three layers (g, h, and i) are to be inverted.

Next, at step 612, the 1D inversion problem is solved for the selected window using the Levenberg-Marquardt algorithm. In the illustrative embodiment of FIG. 9, at this step, the only unknowns of the first selected window that are to be inverted are formation properties of these three layers (g, h, and i) together with bed boundaries within these three layers and the relative dipping angle. Once the topmost inversion problem (i.e., 702) is solved, updated formation properties of layer g are saved as its final inversion solution and the process proceeds to step 614.

At step 614, it is determined whether properties of all the desired layers have been analyzed. If so, the process terminates at step 616. If not, the process proceeds to step 618 where the next inversion window is selected. Returning to the illustrative embodiment of FIG. 9, after the first iteration, at step 614 it is determined whether properties of all the desired layers have been analyzed. Because there are remaining layers after the first iteration, the process goes to step 618 to select the next inversion window. In this iteration (704), updated formation properties of layers h and i obtained from iteration (702) are used as the initial values for the inversion model, and formation properties of layers f and g are known from the prior iteration (702). Once again, the formation model used to calculate the Jacobian matrix is a five-layer formation with outmost boundaries extended to infinity. However, in the second iteration (704), the layer e is removed from the window and the layer j is included with its initial formation properties taken from pre-computed Zero-D inversion results. In the second iteration (704) the total unknowns to be inverted are formation properties of the last three layers (h, i, and j) together with bed boundaries within these three, layers and the relative dipping angle.

Once the second iteration (704) is carried out and the inversion problem is solved, inverted properties of layer h will be saved as its final solution and its properties together with the properties of the layer g will be used as known formation parameters in the next subinversion problem. Properties of layers i and j are updated and will be inverted again with properties of layer k in the next inversion problem (706) in the same manner discussed above with respect to iterations (702) and (704). In this inversion problem, layer f information is no longer required.

The above steps are repeated until all formation layers have been finally solved. To further improve inversion accuracy, after the first inversion processing finishes, a second inversion processing can be applied with initial values taken from the previous inversion results. This loop inversion scheme may also be referred to as a multi-level layer-sliding inversion scheme. Less-layer window inversion results will be used as known initial values for more layer window inversion problems. For instance, in certain embodiments, zero-D inversion results, or inversion results in homogeneous medium, may be used as initial values for the three-layer window inversion problem; the results of the three-layer window inversion may be used as the known initial values for the five-layer window inversion problem, and so forth. In certain embodiments, a three-layer window inversion is followed by another seven-layer window inversion that can generally produce accurate inversion results. Finally, once all the layers have been analyzed, the process is terminated at step 616.

The most computation intensive component of the inversion process is the computation of the Jacobian matrix. If N is the number of unknown parameters, to compute the Jacobian matrix using finite differences at each iteration the total number of forward modeling calls is N+1. Since the computation of the Jacobian matrix is computationally expensive, the following methodology may be used to compute the Jacobian matrix in a manner to save computation time.

Figure 10:
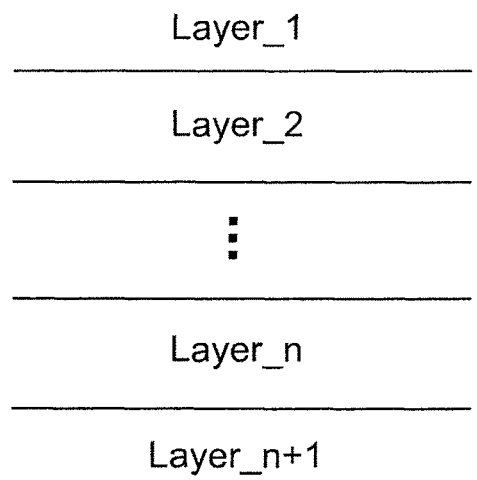
FIG. 10 depicts a 1D formation model in accordance with certain embodiments of the present disclosure.

First, the elements of the Jacobian matrix computed in the previous inversion window are used in the next inversion window. FIG. 10 depicts a 1D formation model. If an N-layer sliding window inversion method is to be used from layer 1 through layer N, the computed Jacobian matrix is expressed as equation (14) in which the elements are sub-matrices with dimensions corresponding to measurements of each layer and the parameters to be inverted in each layer. Accordingly, $A_{i,j}^k$ is the sub-matrix of ith layer's measurements to jth layer's parameters for k-layer sliding window inversion and $A_{i,dip}^k$ is the sub-matrix of ith layer's measurements to dip angle for k-layer sliding window inversion. When the inversion in the inversion window is finished and slides to the next inversion window, some elements of the Jacobian matrix (underlined) can be used in the next inversion window as shown in Equation (15) where the elements expressed with a question mark may be computed using a numerical method.

$$\begin{bmatrix} A_{1,1}^3 & A_{1,2}^3 & \cdots & A_{1,n}^3 & A_{1,dip}^3 \\ A_{2,1}^3 & \underline{A_{2,2}^3} & \cdots & \underline{A_{2,n}^3} & \underline{A_{2,dip}^3} \\ \vdots & \vdots & \ddots & \vdots & \vdots \\ A_{n,1}^3 & \underline{A_{n,2}^3} & \cdots & \underline{A_{n,n}^3} & \underline{A_{n,dip}^3} \end{bmatrix} \quad \text{Eq. (14)}$$

$$\begin{bmatrix} A_{2,2}^3 & \cdots & A_{2,n}^3 & ? & A_{2,dip}^3 \\ \vdots & \ddots & \vdots & :? & \vdots \\ A_{n,2}^3 & \vdots & A_{n,n}^3 & ? & A_{n,dip}^3 \\ ? & \cdots ? & ? & ? & ? \end{bmatrix} \qquad \text{Eq. (15)}$$

In certain embodiments, Broyden's method may be employed in the 1D inversion method to reduce the computation complexity. Accordingly, in the first iteration step of the inversion process, the elements of the Jacobian matrix are required to be computed exactly using forward differences or from the previous inversion window. Then, in the following iteration steps, the Jacobian matrix is estimated using the Broyden's update method as following:

$$J_k \approx J_{k-1} + \frac{\Delta X_k - J_{k-1}\Delta C_k}{\Delta C_k^T \Delta C_k} \Delta C_k^T \qquad \text{Eq. (16)}$$

Where $J_k$ is the Jacobian matrix at $k^{th}$ iteration; $\Delta X_k = [X_k - X_{k-1}]$; $\Delta C_k = [C(X_k) - C(X_{k-1})]$; $X_k$ is the unknown vector after $k^{th}$ iteration; and $C(X_k)$ is the response vector computed with the unknown vector $X_k$. Accordingly, on the $k^{th}$ iteration, an updated estimate of the Jacobian matrix can be calculated from information calculated in the previous iteration and the value of $C_k$ (which has to be calculated anyway).

Broyden's method provides a way of updating an estimate of the Jacobian because it is not necessary to calculate the exact value of the Jacobian at each iteration. In certain embodiments, Broyden's rank-one update formula may be used. The use of Broyden's rank-one update formula is well known to those of ordinary skill in the art having the benefit of this disclosure and will therefore not be discussed in detail herein.

Figure 11:
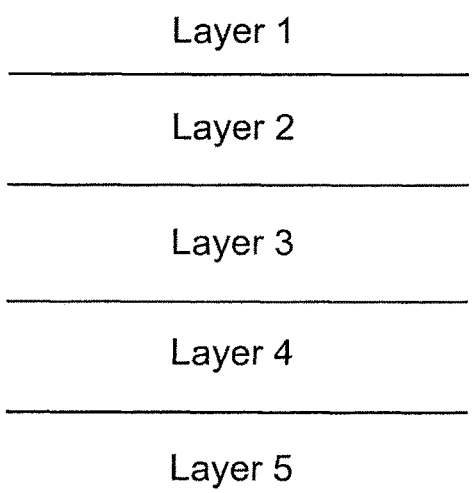
FIG. 11 depicts a 1D formation model with 5 layers.

In certain embodiments, the elements of the Jacobian matrix computed in a less-layer inversion window may be used in a more-layer inversion window. This process will now be discussed in conjunction with the illustrative embodiment of FIG. 11 which shows a 1D formation model with 5 layers. If a three-layer sliding inversion window is used, the Jacobian matrix expressed in equations (17a), (17b) and (17c) may be computed. If the next inversion window is 5 layers, the elements expressed in equation (17) may be used as relative elements in the new inversion window shown in equation (18) in which the 0 elements need not be computed. Accordingly, in the more-layer sliding inversion window, no elements in the Jacobian matrix are required to be computed by numerical method and Broyden's method can be used to upgrade the Jacobian matrix after the first iteration. Stated otherwise, only one forward modeling computation may be required for each iteration in the more-layer sliding window inversion. Consequently, only a one-time Jacobian matrix in a three-layer sliding window inversion is required to be computed by numerical methods in a whole 1D inversion process, thereby saving computation time.

$$\begin{bmatrix} A_{1,1}^3 & A_{1,2}^3 & A_{1,2}^3 & A_{1,dip}^3 \\ A_{2,1}^3 & A_{2,2}^3 & A_{2,3}^3 & A_{2,dip}^3 \\ A_{3,1}^3 & A_{2,3}^3 & A_{3,3}^3 & A_{3,dip}^3 \end{bmatrix} \qquad \text{Eq. (17a)}$$

$$\begin{bmatrix} A_{2,2}^3 & A_{2,3}^3 & A_{2,4}^3 & A_{2,dip}^3 \\ A_{3,2}^3 & A_{3,3}^3 & A_{3,4}^3 & A_{3,dip}^3 \\ A_{4,2}^3 & A_{4,3}^3 & A_{4,4}^3 & A_{4,dip}^3 \end{bmatrix} \qquad \text{Eq. (17b)}$$

$$\begin{bmatrix} A_{3,3}^3 & A_{3,4}^3 & A_{3,5}^3 & A_{3,dip}^3 \\ A_{4,3}^3 & A_{4,4}^3 & A_{4,5}^3 & A_{4,dip}^3 \\ A_{5,3}^3 & A_{5,4}^3 & A_{5,5}^3 & A_{5,dip}^3 \end{bmatrix} \qquad \text{Eq. (17c)}$$

$$\begin{bmatrix} A_{1,1}^3 & A_{1,2}^3 & A_{1,3}^3 & 0 & 0 & A_{1,dip}^3 \\ A_{2,1}^3 & A_{2,2}^3 & A_{2,3}^3 & A_{2,4}^3 & 0 & A_{2,dip}^3 \\ A_{3,1}^3 & A_{2,2}^3 & A_{3,3}^3 & A_{3,4}^3 & A_{3,5}^3 & A_{3,dip}^3 \\ 0 & A_{4,2}^3 & A_{4,3}^3 & A_{4,4}^3 & A_{4,5}^3 & A_{4,dip}^3 \\ 0 & 0 & A_{5,3}^3 & A_{5,4}^3 & A_{5,5}^3 & A_{5,dip}^3 \end{bmatrix} \qquad \text{Eq. (18)}$$

Accordingly, a systematic and rigorous method is disclosed for accurate computation of anisotropic formation resistivity profiles using the MCI tool. The method includes a number of steps including, but not limited to, one or more of quick azimuth angle correction; formation boundaries determination; multi-layer sliding window inversion; and quick Jacobian matrix computation, in which only a one-time three-layer inversion window Jacobian matrix is required to be computed by numerical methods. The methods and systems disclosed herein provide real time and accurate formation resistivity anisotropy evaluation from multi-component induction logging tool measurements.

In certain embodiments, an information handling system having a computer-readable medium may contain machine-readable instructions to perform the methods disclosed herein. The information handling system may also include a user interface allowing a user to monitor, evaluate and modify the process.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method for estimating anisotropic formation resistivity profile of a formation comprising:
   exciting a transmitter of a logging tool;
   receiving one or more measurements from a receiver of the logging tool, wherein the one or more measurements are based on the excitation of the transmitter;
   determining an azimuth angle of the formation based on the one or more measurements;
   locating one or more initial formation bed boundaries of the formation;
   calculating initial formation properties based on one or more selected logging points of the one or more measurements, wherein the one or more selected logging points sit at a middle of each of the one or more initial formation bed boundaries, wherein the initial formation properties comprise at least an initial dipping angle, an initial horizontal conductivity and an initial vertical conductivity;

sequentially selecting each one of a plurality of inversion windows, each inversion window comprising one or more formation layers modelled therein, wherein each inversion window comprises at least one formation layer of the one or more formation layers in common with one other inversion window; and performing a one-dimensional inversion of each of the sequentially selected one of the plurality of inversion windows until the one or more formation layers for each plurality of inversion windows have been finally modelled, wherein a first one of the one-dimensional inversion is based on the initial formation properties, and wherein each subsequent one of the one-dimensional inversion is based on at least one previous one of the one-dimensional inversion;

determining one or more formation properties for the one or more layers, one or more formation bed boundaries within the one or more layers, and a relative dipping angle for each plurality of inversion windows based on the one-dimensional inversion; and estimating an anisotropic formation resistivity profile based on the one or more formation properties, the one or more formation bed boundaries and the relative dipping angle for each plurality of inversion windows based on the one-dimensional inversion.

2. The method of claim 1, further comprising obtaining borehole corrected log data, wherein obtaining borehole corrected log data comprises directing the logging tool to a desired location in a wellbore and obtaining the one or more measurements.

3. The method of claim 2, wherein at least one of obtaining borehole corrected log data, determining the at least one of the azimuth angle of the formation, determining the one or more formation bed boundaries, calculating the initial formation properties, sequentially selecting the one of the plurality of inversion windows, and performing the one-dimensional inversion of each of the sequentially selected one of the plurality of inversion windows is performed using an information handling system.

4. The method of claim 1, wherein determining the one or more formation bed boundaries comprises using a variance based method.

5. The method of claim 4, wherein the variance based method comprises:

computing a variance value for the borehole corrected log data;

determining a variance curve for the borehole corrected log data; and using the variance curve to locate the one or more formation bed boundaries.

6. The method of claim 5, wherein the location of the one or more formation bed boundaries is determined based on one or more peak positions of the variance curve.

7. The method of claim 1, wherein at least one of Levenberg-Marquardt algorithm and Broyden's method are used to perform the one-dimensional inversion of each of the sequentially selected one of the plurality of inversion windows.

8. An information handling system having a computer-readable medium containing machine readable instructions to:

receive one or more measurements from a receiver of a logging tool disposed in a borehole of a formation, wherein the one or more measurements are based on an excitation of a transmitter of the logging tool;

determine an azimuth angle of the formation based on the one or more measurements;

locate one or more initial formation bed boundaries;

calculate initial formation properties based on one or more selected logging points of the one or more measurements, wherein the one or more selected logging points sit at a middle of each of the one or more initial formation bed boundaries, wherein the initial formation properties comprise at least an initial dipping angle, an initial horizontal conductivity and an initial vertical conductivity;

sequentially select each one of a plurality of inversion windows, each inversion window comprising one or more formation layers modelled therein, wherein each inversion window comprises at least one formation layer of the one or more formation layers in common with one other inversion window; and perform a one-dimensional inversion of each of the sequentially selected one of the plurality of inversion windows until the one or more formation layers for each plurality of inversion windows have been finally modelled, wherein a first one of the one-dimensional inversion is based on the initial formation properties, and wherein each subsequent one of the one-dimensional inversion is based on at least one previous one of the one-dimensional inversion;

determining one or more formation properties for the one or more layers, one or more formation bed boundaries within the one or more layers, and a relative dipping angle for each plurality of inversion windows based on the one-dimensional inversion; and estimate an anisotropic formation resistivity profile based on the one or more formation properties, the one or more formation bed boundaries and the relative dipping angle for each plurality of inversion windows based on the one-dimensional inversion.

9. The information handling system of claim 8, wherein the computer-readable medium further contains machine readable instructions to obtain borehole corrected log data, wherein obtaining borehole corrected log data comprises directing the logging tool to a desired location in the borehole and obtaining the one or more measurements.

10. The information handling system of claim 8, wherein determining the one or more formation bed boundaries comprises using a variance based method.

11. The information handling system of claim 10, wherein the variance based method comprises:

computing a variance value for the borehole corrected log data;

determining a variance curve for the borehole corrected log data; and using the variance curve to locate the one or more formation bed boundaries.

12. The information handling system of claim 11, wherein the location of the one or more formation bed boundaries is determined based on one or more peak positions of the variance curve.

13. The information handling system of claim 8, wherein at least one of Levenberg-Marquardt algorithm and Broyden's method are used to perform the one-dimensional inversion of each of the sequentially selected one of the plurality of inversion windows.

14. A method for determining one or more parameters of a formation comprising:
- placing a logging tool at a desired location in the formation;
- exciting a transmitter of the logging tool;
- receiving one or more measurements from a receiver of the logging tool, wherein the one or more measurements are based on the excitation of the transmitter;
- determining an azimuth angle of the formation using the one or more measurements;
- determining one or more initial boundary positions of the formation;
- calculating one or more initial formation parameters based on one or more selected logging points of the one or more measurements, wherein the one or more selected logging points sit at a middle of each of the one or more initial boundary positions, wherein the initial formation properties comprise at least an initial dipping angle, an initial horizontal conductivity and an initial vertical conductivity;
- sequentially selecting each one of a plurality of inversion windows, each inversion window comprising one or more formation layers modelled therein, wherein each inversion window comprises at least one formation layer of the one or more formation layers in common with one other inversion window;
- performing a one-dimensional inversion of each of the sequentially selected one of the plurality of inversion windows until the one or more formation layers for each plurality of inversion windows have been finally modelled, wherein a first one of the one-dimensional inversion is based on the initial formation properties, and wherein each subsequent one of the one-dimensional inversion is based on at least one previous one of the one-dimensional inversion; and
- determining one or more formation properties for the one or more layers, one or more bed boundary positions within the one or more layers, and a relative dipping angle for each plurality of inversion windows based on the one-dimensional inversion.

15. The method of claim 14, wherein the logging tool is selected from a group consisting of a logging while drilling (LWD) tool and a measurement while drilling (MWD) tool.

16. The method of claim 14, wherein determining the one or more bed boundary positions of the formation comprises using a variance based method.

17. The method of claim 16, wherein the variance based method comprises:
- computing a variance value for the one or more measurements;
- determining a variance curve for the one or more measurements; and
- using the variance curve to locate the one or more bed boundary positions.

18. The method of claim 17, wherein the one or more bed boundary positions are determined based on one or more peak positions of the variance curve.

19. The method of claim 14, wherein at least one of Levenberg-Marquardt algorithm and Broyden's method are used to perform a one-dimensional inversion of each of the sequentially selected one of the plurality of inversion windows.

20. The method of claim 14, wherein at least one of placing the logging tool at the desired location in the formation, receiving the one or more measurements, determining the azimuth angle, determining the one or more bed boundary positions, calculating the one or more initial parameters, sequentially selecting the one of the plurality of inversion windows and performing the one-dimensional inversion is performed by an information handling system.

* * * * *